US007310657B2

(12) United States Patent
Nakamura

(10) Patent No.: US 7,310,657 B2
(45) Date of Patent: Dec. 18, 2007

(54) OWNER IDENTIFICATION OF COLLABORATION WORK OBJECT

(75) Inventor: Koichi Nakamura, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 592 days.

(21) Appl. No.: 09/843,548

(22) Filed: Apr. 26, 2001

(65) Prior Publication Data
US 2002/0072947 A1    Jun. 13, 2002

(30) Foreign Application Priority Data
Apr. 26, 2000    (JP)    ............................. 2000-126622

(51) Int. Cl.
*G06F 15/16*    (2006.01)
(52) U.S. Cl. ...................................... 709/205; 709/204
(58) Field of Classification Search ................ 709/204, 709/205
See application file for complete search history.

(56) References Cited

U.S. PATENT DOCUMENTS

| | | | | |
|---|---|---|---|---|
| 5,841,977 A | * | 11/1998 | Ishizaki et al. ............. | 709/204 |
| 5,872,924 A | * | 2/1999 | Nakayama et al. ......... | 709/205 |
| 6,286,034 B1 | * | 9/2001 | Sato et al. .................. | 709/204 |
| 6,463,460 B1 | * | 10/2002 | Simonoff ..................... | 709/203 |
| 6,639,608 B1 | * | 10/2003 | Itakura ........................ | 345/738 |
| 6,639,996 B2 | * | 10/2003 | Suda ........................... | 382/100 |
| 6,823,363 B1 | * | 11/2004 | Noveck et al. ............. | 709/204 |
| 7,062,532 B1 | * | 6/2006 | Sweat et al. ................ | 709/205 |
| 2001/0042075 A1 | * | 11/2001 | Tabuchi ....................... | 709/205 |
| 2002/0133546 A1 | * | 9/2002 | Liang et al. ................. | 709/204 |
| 2002/0186244 A1 | * | 12/2002 | Matsuda et al. ............ | 709/205 |
| 2003/0009521 A1 | * | 1/2003 | Cragun ........................ | 709/205 |

FOREIGN PATENT DOCUMENTS

| | | |
|---|---|---|
| JP | 08-305663 | 11/1996 |
| JP | 08-307842 | 11/1996 |

* cited by examiner

*Primary Examiner*—Valencia Martin-Wallace
*Assistant Examiner*—Hassan Phillips
(74) *Attorney, Agent, or Firm*—Ference & Associates LLC

(57) ABSTRACT

To easily identify the owner of an object currently drawn on a collaboration work area, or an object already drawn thereon, to easily carry out an editing operation for the object of each owner by selectively identifying the object drawn by a particular owner. A user management table registers the node identification code and the owner identifier of a user system therein, and an object management table registers the node identification code and object information therein. Based on an event entry for an object, the node identification code of the object management table is obtained, and the owner identifier of the user management table is obtained. This owner identifier is displayed on a screen by relating it to the object.

13 Claims, 19 Drawing Sheets

FIG. 6

$\swarrow^{113}$

| OBJECT | | 1 | 2 | 3 | ... |
|---|---|---|---|---|---|
| OBJECT TYPE (LINE, SQUARE, ETC.) | | $K_1$ | $K_2$ | $K_3$ | ... |
| STARTING POINT | X | $_bX_1$ | $_bX_2$ | $_bX_3$ | ... |
| | Y | $_bY_1$ | $_bY_2$ | $_bY_3$ | ... |
| FINISHING POINT | X | $_eX_1$ | $_eX_2$ | $_eX_3$ | ... |
| | Y | $_eY_1$ | $_eY_2$ | $_eY_3$ | ... |
| Node ID | | $NID_1$ | $NID_2$ | $NID_3$ | ... |
| GRAYING-OUT FLAG | | 0 \| 1 | 0 \| 1 | 0 \| 1 | ... |

(a)

(b)

(c)

OWNER IDENTIFICATION OF COLLABORATION WORK OBJECT

CLAIM FOR PRIORITY

This application claims priority from Japanese Application No. 2000-126622, filed on Apr. 26, 2000, and which is hereby incorporated by reference as if fully set forth herein.

FIELD OF THE INVENTION

The present invention relates to a computer system having a plurality of clients, or a system for providing an environment for collaboration work carried out by using a computer network. More particularly, the invention relates to a system advantageous for the owner identification of an object created by collaboration work.

BACKGROUND OF THE INVENTION

With the progress in computer network technology in recent years, the needs of utilizing World Wide Web (WWW) for businesses, transactions, work, and so on, have increased. Businesses are rarely carried out by individuals alone but, in general, a plurality of users simultaneously shares the same information, and carry out work in collaboration.

As a technology for providing the environment of collaboration work using Web, for example, there is a technology described in Japanese Patent Laid-Open Hei 10 (1998)-134461. This publication discloses a computer system and a method of execution invented for the purpose of providing a system designed to enable two or more users of the Internet to move or modify Hyper Text Markup Language (HTML) documents while referring to the same. The computer system described therein includes browsers and web sharing managers provided in the shared client computer systems of a source and a receiver, and is constructed in such a manner that the web sharing manager of the shared client computer system of the receiver can receive the event message of the source from the web sharing manager of the source. Accordingly, the event message is shared by the source and receiver, and the displaying and controlling of the same web page are simultaneously realized on the shared client computer systems.

In Japanese Patent Laid-Open Hei 5 (1993)-113975, a shared document processing system is described, which was invented for the purpose of displaying the modified place and content of a document shared and used by a plurality of users or groups of users, with comments. Specifically, the publication discloses a technology for storing a stored edited document, comments, edition information, and so on, in linkage, and retrieving these bits of information from terminals. In this case, for a plurality of terminals having an editor unit for editing each of the document comments, the edition information, and so on, or a management unit for each of those, a storage unit is provided in common to store each of the edited documents, the comments, the edition information, and so on. This arrangement enables a user to see the modified place and content of the document, a reason for the modification, and so on, while verifying the relation thereof Thus, it is considered that understanding of each other and the efficiency of collaborative editing work can be enhanced in sharing information within a work group.

In Japanese Patent Laid-Open Hei 10 (1998)-134002, a collaboration work support system is described, which was invented to enable a creator of drawing information or the like within a file, to be contacted by using optional communication means. According to this collaboration work support system, the contact address of a creator for the communication medium of at least one kind is stored corresponding to identification information regarding the creator of drawing information, the contact address information is obtained in response to an instruction from a user reading the drawing information, and the computer of the user is connected to the contact address of the creator.

The technologies described in the foregoing publications provides a collaboration work environment using WWW, makes it possible to refer to editing, comments and edition information regarding the document in common, and establishes user's quick contact with the creator of drawing information regarding the document or the like.

However, in the case of collaboration work carried out based on the conventional technologies, there is no concept of ownership for each object on a collaboration work area, i.e., no definition of who owns the object (ones of all the objects provided in the work environment, e.g., drawings, documents, characters, images, moving images, voices, combination of them and so on). Consequently, if a plurality of users take part in collaboration work, it is impossible to determine who owns a displayed object currently being drawn or who has drawn a currently displayed object that has already been drawn. In addition, there may be a case of selecting objects belonging to a certain owner, among the drawn objects, for editing operation including changing, modification, deletion, and so on. In the conventional technologies having no concept of ownership, however, such operations cannot be executed in the block.

SUMMARY OF THE INVENTION

The present invention broadly contemplates identifying the owner of an object that is currently being drawn on a collaboration work area, or an object that has already been drawn on the collaboration work area. The present invention also contemplates selectively identifying objects drawn by a certain owner among objects on the collaboration work area. The present invention further contemplates facilitating an editing operation of objects for each owner.

The present invention can be summarized as follows. Specifically, a computer system of the present invention comprises a plurality of user systems connected to each other, each thereof being adapted to display a work area on a display screen, alternatively a plurality of user systems connected to each other through a computer network. In this case, each of the user systems includes: collaboration work controller having a user management table for registering a node identification code given for each of the user systems and an owner identifier related to the node identification code, and an object management table for registering object information related to the node identification code; and an obtainer for obtaining, based on an event entry for an object, the node identification code related to the object by referring to the object management table, obtaining the owner identifier related to the obtained node identification code by referring to the user management table, and displaying the object on the screen in a manner that the obtained owner identifier can be discriminated from owner identifiers of other objects.

The present invention also provides a method of identifying a collaboration work object, the object having been created based on collaboration work by using a computer system having a plurality of user systems connected to each other, alternatively a plurality of user systems connected to each other through a computer network. The method comprises the steps of: when any one of the plurality of user systems receives collaboration work data from the other user system, causing the user system to obtain a node identification code contained in the collaboration work data, obtaining an owner identifier related to the obtained node identification code by referring to the user management table of the user system; and when an object is displayed on a screen of the user system by using object data contained in the collaboration work data, displaying the owner identifier by means of superposition at one of starting and finishing points of the object, and other points of the same.

The present invention also provides a method of identifying a collaboration work object, the object having been created based on collaboration work by using a computer system having a plurality of user systems connected to each other, alternatively a plurality of user systems connected to each other through a computer network. The method comprises the steps of: causing one of the user systems to store object data contained in collaboration work data received from other user systems into an object management table by relating the data to a node identification code of each of other user systems, and to display the object thereof on a screen of the user system; when the object displayed on the screen is selected, obtaining the node identification code by referring to the object management table; obtaining an owner identifier related to the obtained node identification code by referring to the user management table of the user system; and displaying the owner identifier on the screen by means of superposition at one of starting and finishing points of the object, and other points of the same.

According to the computer system and the identifying method of the invention, since the owner identifier is displayed in relation to the object, the owner of the object can be easily identified. As the owner identifier, a character, a graphic, a picture character (icon) or the like, which are defined for each owner, can be used.

The event entry may be a drawing operation carried out by the owner of the object or a selection operation carried out by a user other than the owner. In the case of the drawing operation by the owner, the owner identifier is displayed while the object is being drawn, i.e., while the object is being created (real time). Accordingly, during collaboration work carried out by a plurality of users (especially three or more), the owner of the object can be identified in real time. In the case of the selection operation by the user other than the owner, the owner identifier is displayed when selection is operated. In other words, the owner of each object can be identified whenever the user makes a request after the drawing of the object.

The selection operation preferably includes an operation for sequentially selecting objects by using, for example a tab key or the like, an operation for moving a pointer on the screen (work area) to an object by using an input device such as a mouse or the like and then clicking with the mouse, and an operation for simply moving the pointer to the object and maintaining its position for a fixed period. The position of displaying the owner identifier may be set at one of the starting and finishing points of the object, and other points superposing on the points constituting the object.

In the specification, a description of "drawing" an object, unless specified otherwise, includes an operation for creating an object displayed on the screen, such as "input", "link" or the like. In other words, as described above, objects include not only a graphic and an image but also a character, a document, a moving image, a voice, and so on. Thus, the operation for displaying the object such as a character, a voice or the like is included in the concept of "object drawing".

A computer system of the present invention preferably comprises a plurality of user systems connected to each other, alternatively a plurality of user systems connected to each other through a computer network. In this case, each of the user systems includes: collaboration work controller having a user management table for registering a node identification code given for each of the user systems, and an object management table for registering object information related to the node identification code; and an obtainer for obtaining, based on the selection operation for selecting an owner, the node identification code of the user system related to the selected owner by referring to the user management table, obtaining objects related to the obtained node identification code by referring to the object management table, and displaying the objects on a screen in a manner of discrimination from other objects.

The present invention further provides a method of identifying collaboration work objects, the objects having been created based on collaboration work by using a computer system having a plurality of user systems connected to each other, alternatively a plurality of user systems connected to each other through a computer network. The method comprises the steps of: causing one of the user systems to store object data contained in collaboration work data received from the other user systems into an object management table by relating the data to a node identification code of each of the other user systems, and to display the object thereof on a screen of the user system; when any one of owners taking part in the collaboration work is selected, obtaining a node identification code given for a user system of the selected owner, by referring to a user management table of the user system; obtaining objects related to the obtained node identification code, by referring to the object management table; and displaying all the obtained objects on a screen in a manner of discrimination from other objects.

According to the computer system and the identifying method of the invention, focusing on a certain owner, the objects of this owner can be displayed by being discriminated from the objects of other owners. Accordingly, during collaboration work, after the collaboration work, or even if work is reviewed by a third party after the work, attention can be paid only to objects drawn by a certain owner on a collaboration work area. As an example of the method of displaying objects of the discriminately selected owner from the objects of the other owners, the objects of the selected owner may be indicated by a solid line, and the objects of the other owners may be indicated in gray to be unseen (graying out). In addition, as an example of the method of selecting a particular owner, a list of members taking part in the collaboration work may be displayed on a dialogue menu, a menu indicated on the title bar of the collaboration work area or the like, and then selection may be made therefrom.

In the foregoing case, an editor or a step of performing an editing operation including copying, movement, deletion and others for the obtained object can be provided. Thus, editing operation of the objects for each owner is made possible. In this case, furthermore, security level information related to the node identification code may be registered in the use management table, and the editing operation is permitted within a range compliant with the security level information. Thus, it is possible to secure the result of collaboration work including deletion of the object or the like, by restricting the operations by unauthorized person other than the owner.

Any of the foregoing computer systems can be provided with a deletor or a step of deleting or removing the owner identifier displayed on a screen or display of the obtained objects discriminately from other objects on the screen. Accordingly, by displaying the owner identifier only when it is considered necessary, it is possible to make effective use of the limited display screen.

Furthermore, the computer system of the invention further comprises a controller which controls a session for each collaboration work. In this case, the session controller includes a session management table for registering a session identification code for identifying the session, a user identification code for identifying a user taking part in the session, and a node identification code of the user system used by the user. In addition, the session controller refers to the session management table, and can transmit the data to the other user systems taking part in the session regarding all the sessions registering the user identification code contained in data sent from the user. Such an arrangement enables the present invention to be realized even if a session manager (session server) is interpolated.

For a better understanding of the present invention, together with other and further features and advantages thereof, reference is made to the following description, taken in conjunction with the accompanying drawings, and the scope of the invention that will be pointed out in the appended claims.

BRIEF DESCRIPTION OF THE DRAWINGS

FIG. 6 is a table showing an example of an object management table.

DETAILED DESCRIPTION OF THE PREFERRED EMBODIMENT

Figure 1:
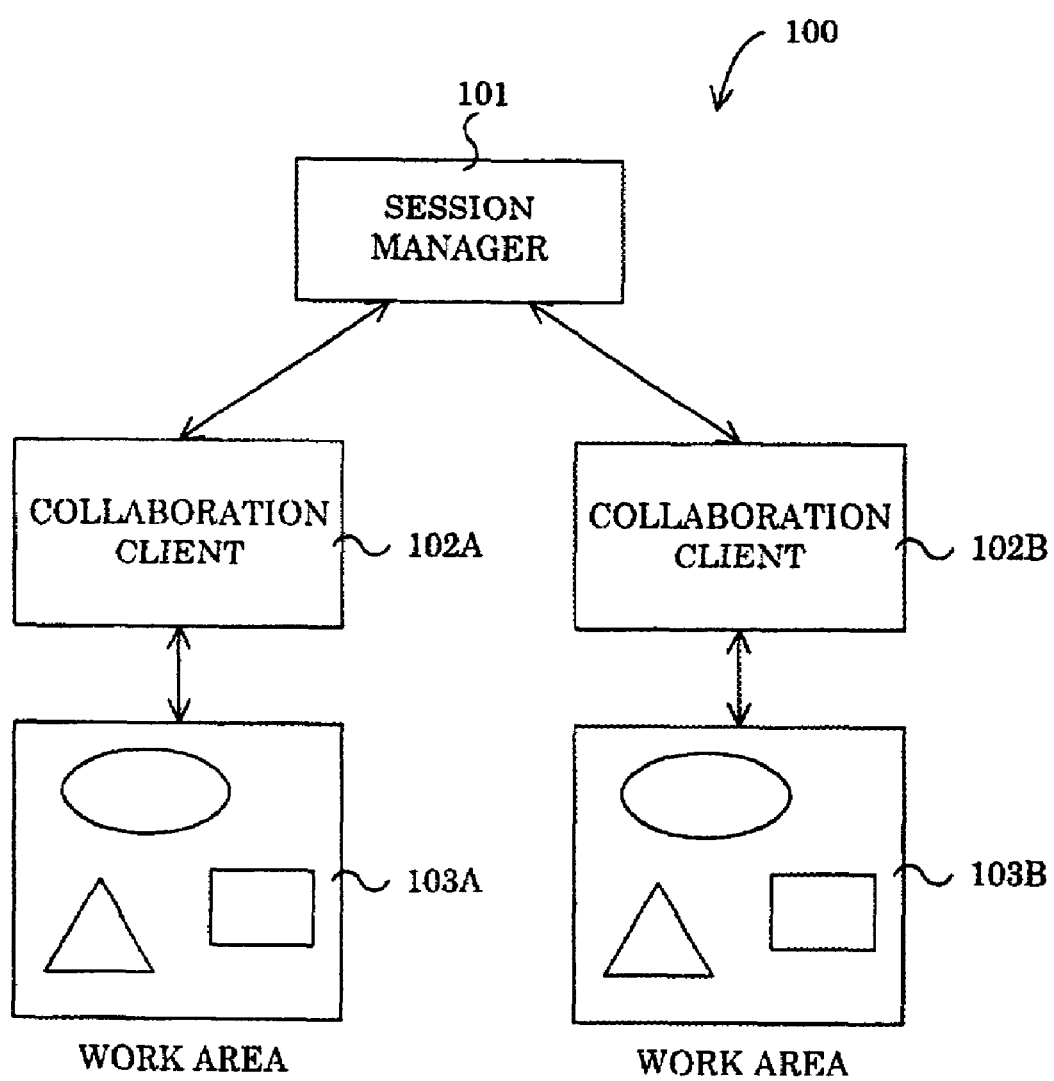
FIG. 1 is a conceptual view showing a concept of a collaboration work system according to an embodiment of the present invention.

The presently preferred embodiment of the present invention will now be explained in detail while referring to the accompanying drawings. The invention can be carried out by various modes, and it should not be limited to the contents described in the embodiments. Throughout the entire embodiments, like elements and portions are denoted by like reference numerals.

The embodiments described below mainly concern a method and a system. However, as can be understood by those skilled in the art, in addition to the method and the system, the invention provides medium recording program codes, which can be used in a computer. Therefore, the present invention can take the form of hardware, software or a combination of the both. For the medium recording program codes, an optional computer readable medium such as a hard disk, a CD-ROM, an optical memory, or a magnetic memory can be used.

The computer system of the embodiments comprises a central processing unit (CPU), a main memory [RAM (Random Access Memory)], a nonvolatile memory [ROM (Read Only Memory)], and so on. These elements are interconnected by a bus. Other than these, a coprocessor, an image accelerator, a cache memory, an I/O control unit (I/O) and so on, are connected to the bus. Through a proper interface, an external memory, a data input device, a display device, a communication control unit and so on, may also be connected to the bus. In addition, needless to mention, hardware resources that computer systems generally have can be provided. As the external memory, a hard disk device is typically used. Other than this, apparently, a magneto-optical memory, an optical memory, a semiconductor memory such as a flash memory or the like may be selected. A read-only memory such as a CD-ROM used for reading data is fallen into such external memories if it is used only for reading data or programs. The data input device can be provided with an input device such as a keyboard, and a pointing device such as a mouse or the like. The data input device also includes a voice input unit. As the display device, a CRT, a liquid crystal display device, or a plasma display device can be used. For the computer system of the invention, one may be selected from various computers such as a personal computer, a work station, a mainframe computer and the like.

A program used in each computer system may be recorded in other computer systems. In other words, a part of the programs used by the computer system can be processed or executed by a remote computer in a distributed manner. To refer to programs recorded in the other computer systems based on addresses, a DNS, a URL or the like can be used.

For communications carried out between the computer systems described in the embodiments, a LAN, a WAN or the like interconnecting a plurality of computer systems may be used. Also, the Internet is available. A communication line used for such a connection may be a dedicated or public line. The present invention may also be realized in a single computer system.

The term Internet in the specification includes both Intranet and Extranet. Access to the Internet also means access to the Intranet or the Extranet. The term computer network includes both a computer network to be publicly accessed and a computer network to be accessed only privately.

FIG. 1 is a conceptual view showing the concept of a collaboration work system according to a first embodiment of the present invention. The collaboration work system 100 of the embodiment includes collaboration clients 102A and 102B as user systems interconnected through a session manager 101. For the respective collaboration clients, work areas 103A and 103B are created. The work areas 103A and 103B are areas displayed on the screens of the collaboration clients 102A and 102B, which are functions to be realized by software. Each of these work areas has the functions of, in addition to displaying, editing and so on, of various documents (e.g., HTML documents), entering, displaying, editing and so on, of an optional drawn graphic in the manner of superposition on currently displayed documents or graphics as annotation data. Each of the areas also has the functions of entering data to a data field included in HTML documents or the like, and displaying, and editing the entered data.

Here described is the case of two collaboration clients (user systems). Needless to say, however, more user systems can be interconnected. The collaboration systems have similar constitutions, and are functionally equivalent to each other. In other words, if one of the collaboration clients is a transmitter of collaboration work data, the other clients function as a receiver of the collaboration work data. However, an arbitrary collaboration client can function as any one of the transmitter and receiver. In practice, the functions of such receiver and transmitter are switched in a complicated manner. In the specification, if there is no need to distinguish between the collaboration clients 102A and 102B, the expression collaboration client 102 is simply used.

Figure 2:
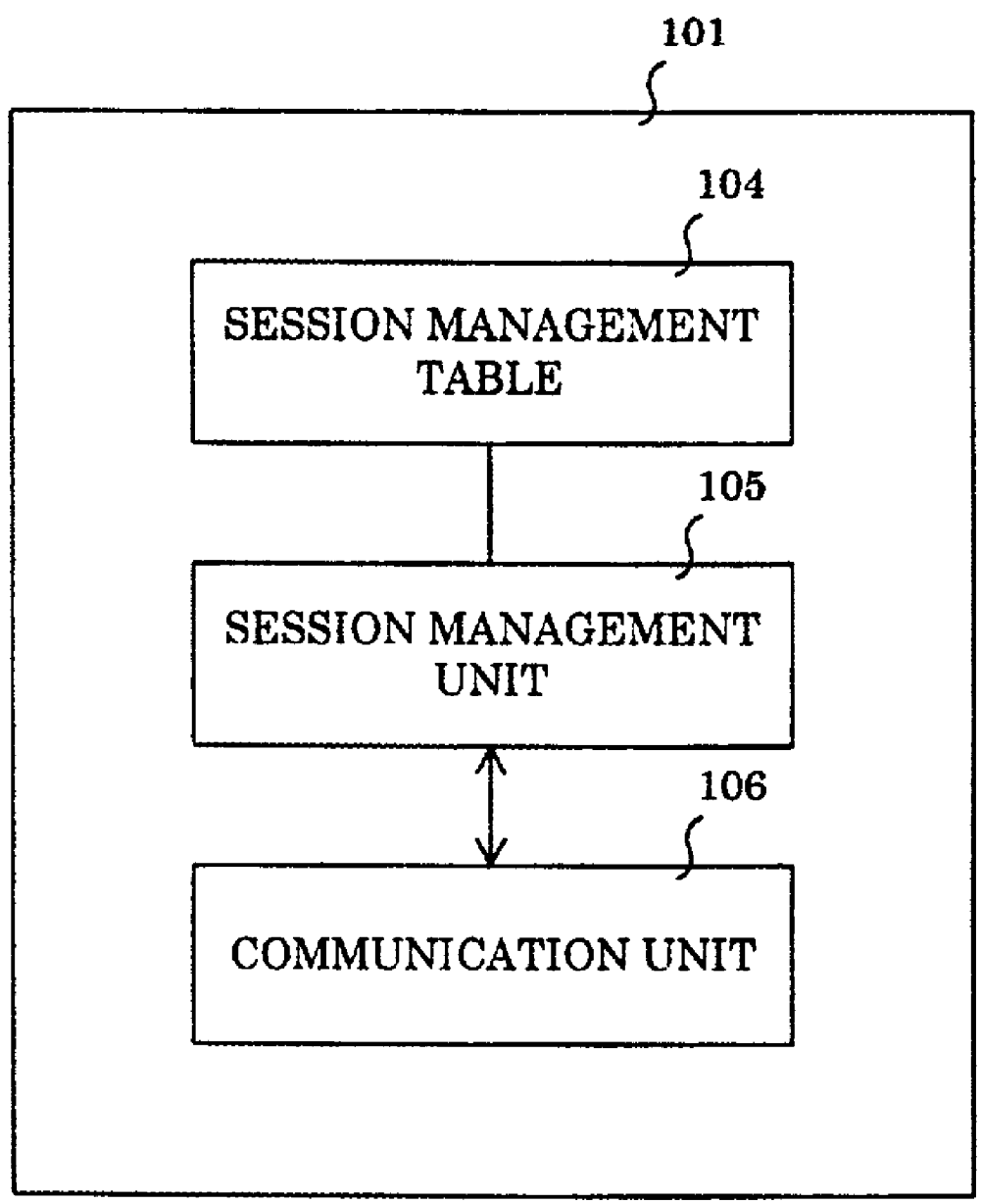
FIG. 2 is a block diagram showing an example of a constitution of a session manager.
Figure 3:
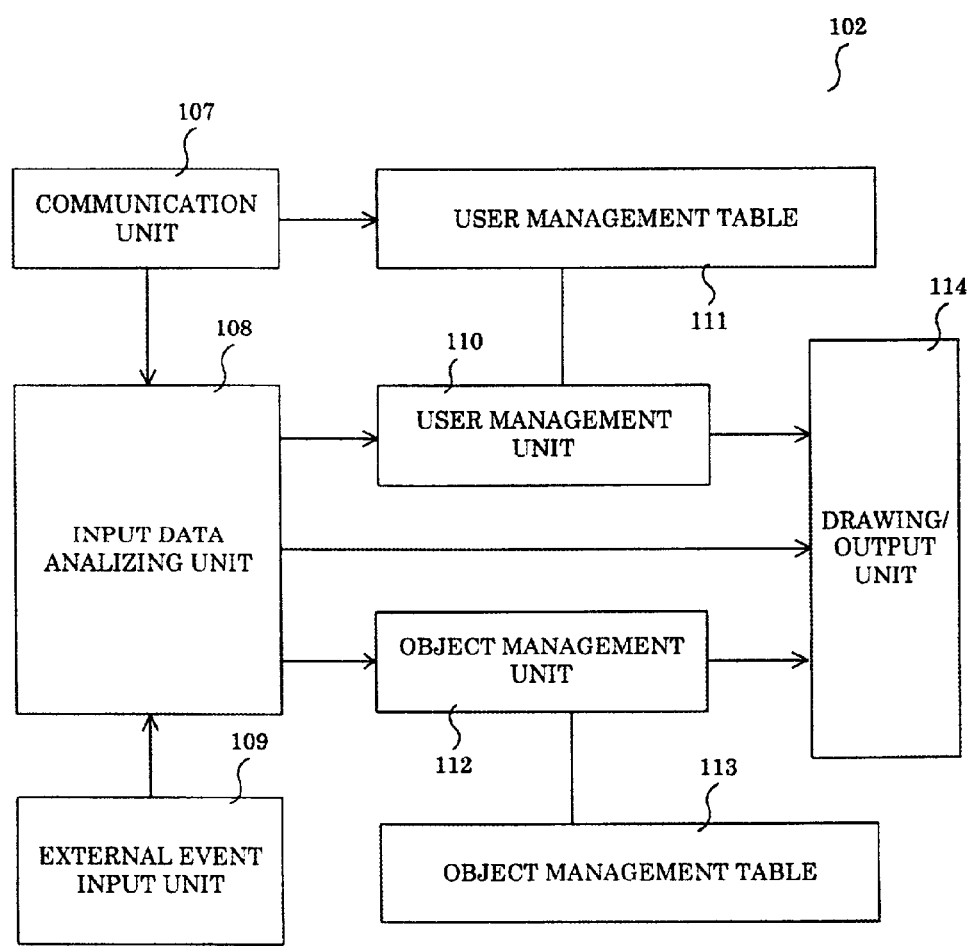
FIG. 3 is a block diagram showing an example of a constitution of a collaboration client.

FIG. 2 is a block diagram showing an example of the constitution of the session manager. FIG. 3 is a block diagram showing an example of the constitution of the collaboration client. The session manager 101 includes a session management table 104, a session management unit 105 and a communication unit 106. The collaboration client 102 includes a communication unit 107, an input data analyzing unit 108, an external event input unit 109, a user management unit 110, a user management table 111, an object management unit 112, an object management table 113, and a drawing/output unit 114.

Upon receiving data from a certain user, the session management unit 105 transfers the data to another user taking part in the same session. The transmitting/receiving of the data is carried out through the communication unit 106.

Figure 4:
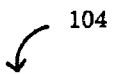
FIG. 4 is a table showing an example of a session management table.

Determination as to the transfer destination of the received data is made by referring to the session management table 104. FIG. 4 is a table showing an example of the session management table 104. As shown in FIG. 4, the session management table 104 registers a session ID (SID) for each session, ID of users (UID) taking part in the session, and node IDs (NID) for the system of the users (collaboration client). The session management unit 105 obtains a session ID from the received data, and then transmits the data to other users of a user list contained in the session ID by referring to the session management table 104. For a transmission destination, reference is made to the node ID.

For the communication units 106 and 107, all kinds of technologies enabling communications among the computer systems can be used. For example, one may be selected from an interface compliant with TCP/IP Protocol, a data terminal such as a modem/terminal adaptor or the like, a LAN interface, and so on. For the communication unit 106, an encryption technology such as a widely known SSL or the like can be used.

The input data analyzing unit 108 analyzes data received through the communication units 106 and 107 from the session manager 101 or an entry from the external event input unit 109. For example, the input data analyzing unit 108 obtains a node ID (NID) contained in the received data, obtains an owner identifier, security level, object data, and so on, described later, and then passes each data to the user management unit 110 and the object management unit 112. In addition, the input data analyzing unit 108 functions to generate a proper operation according to an entry from the external event input unit 109.

The external event input unit 109 receives an entry from the external unit, for example object selection made by using the pointing device such as a mouse or the like, or an entry from the input device such as a keyboard or the like, and passes the entry as an event to the input data analyzing unit 108.

Figure 5:
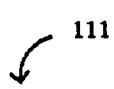
FIG. 5 is a table showing an example of a user management table.

The user management unit 110 manages users taking part in collaboration work. For the user management at the user management unit 110, reference is made to the user management table 111. FIG. 5 is a table showing an example of the user management table 111. The user management table 111 registers a node ID (NID), a user name (U), an owner identifier (OID) and a security level (S) for each user taking part in the collaboration work. The node ID is provided to identify the user system (collaboration client 102) used by the user as described above. The user name (U) indicates a name of the user. The owner identifier (OID) is an individual identifier given to the user, which may be a character, a graphic, a picture character (icon) or the like indicating the user. The security level (S) is a code provided to specify a level permitted when other users add editing, deletion or the like to an object owned by the user. The operation of the user management unit 110 carried out by referring to the user management table 111 will be described in detail later in connection with a method of identification.

The object management unit 112 manages objects displayed on the screen of the user system by referring to the object management table 113. FIG. 6 is a table showing an example of the object management table 113. The object management table 113 registers object data, a node ID (NID), and a graying-out flag for each object. The object data includes, for example, the type of an object (line, square or the like), and data regarding the starting and finishing points of the object. The data regarding the starting and finishing points is given by, for example an x and y coordinate. The graying-out flag indicates whether the object is being displayed by a solid line (flag=0) or by graying-out (flag=1). Herein, the case of graying-out is described. However, the way of indication is not limited to the graying-out, and any can be used as long as it can display the object by means of discrimination. For example, needless to say, the type of indicating the object by changing its color, or adding three-dimensional ornaments, and others may be used.

The drawing/output unit 114 is a control unit for displaying an object on the display device of the user system. The objects controlled to be displayed by the drawing/output unit 114 are displayed in the work area 103. As descried later, the objects, user identifiers and so on are displayed.

Figure 7:
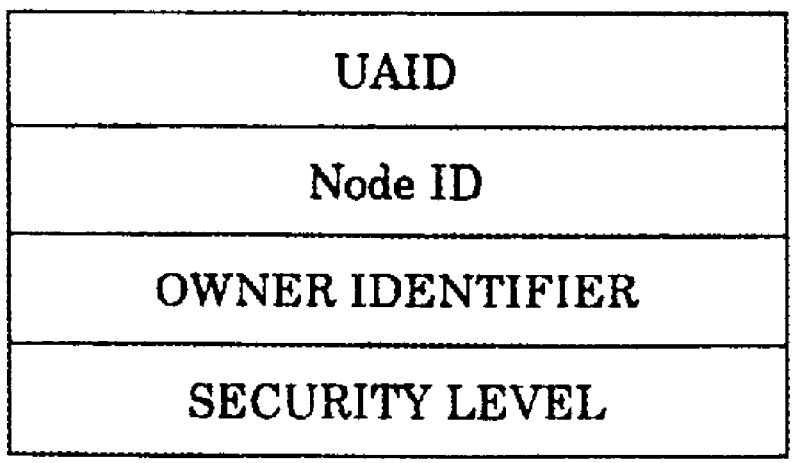
FIG. 7 is a view showing a format of data transmitted/received when collaboration work is started.
Figure 8:
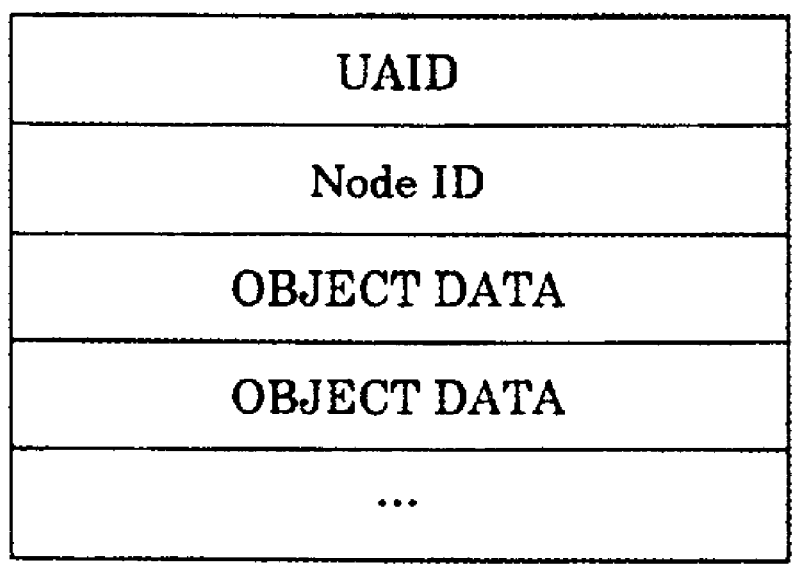
FIG. 8 is a view showing a format of data transmitted/received during collaboration work.

Next, description will be made of the method of identifying collaboration work objects using the foregoing system. FIG. 7 shows the format for data transmitted/received when collaboration work is started. The data at the time of starting the collaboration work includes a user ID (UAID), a node ID, an owner identifier, and a security level. FIG. 8 shows the format for data transmitted/received during the collaboration work. The data during the collaboration work includes a user ID (UAID), a node ID and object data. The object data may be plural.

Figure 9:
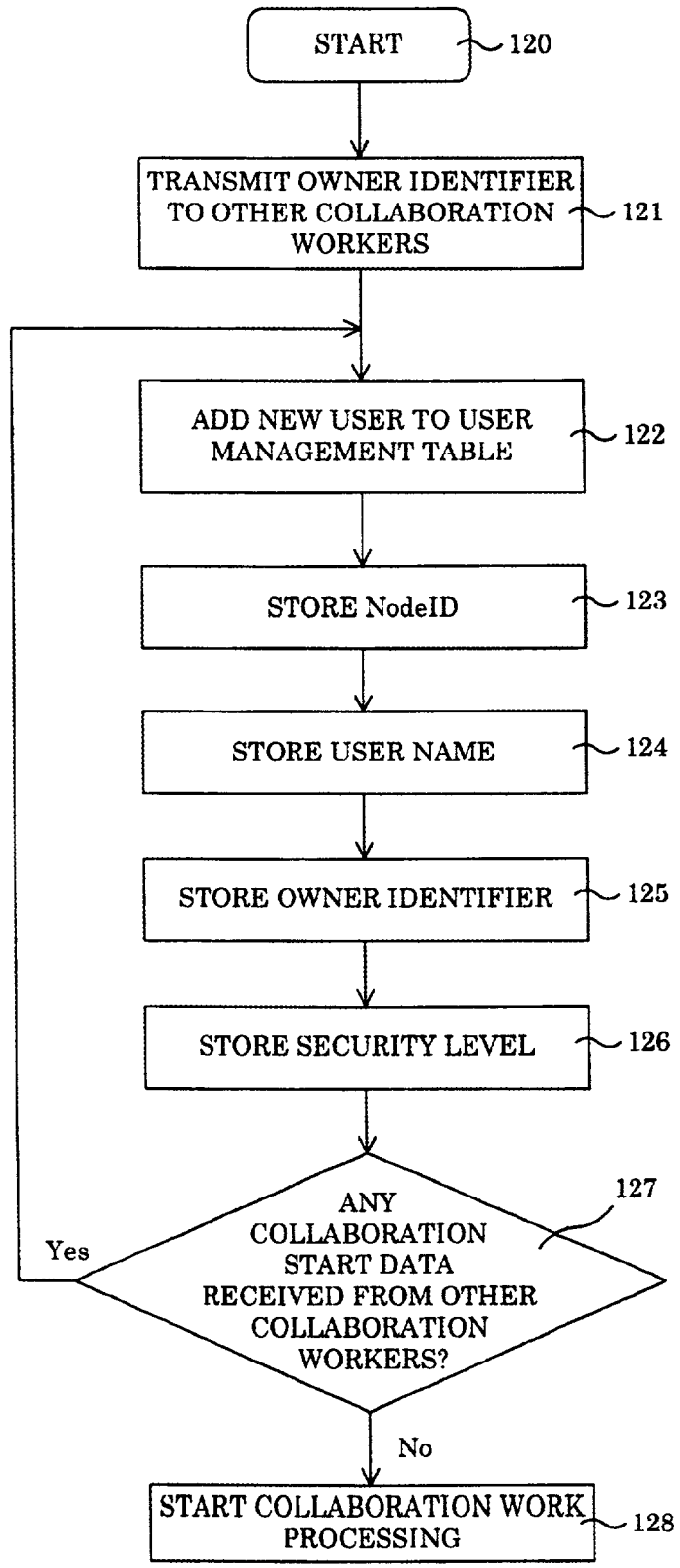
FIG. 9 is a flow chart showing an example of an operation when collaboration work is started.

FIG. 9 is a flow chart showing an example of an operation carried out when the collaboration work is started. When a certain collaboration client 102 starts collaboration work (step 120), data containing an owner identifier is transmitted to other collaboration workers (collaboration client 102) (step 121). This data has a data format like that shown in FIG. 7. The transmission of the data is carried out to the session manager 101. The session manager 101 obtains the user ID (UAID) contained in the data, and then transmits this data to the nodes listed in NID (excluding a data originator) of a session including the UAID by referring to the session management table 104.

Then, the collaboration client 102 that has received the data adds a new user to the user management table 111 (step 122). Subsequently, in the new user section of the user management table 111, a node ID, a user name, an owner identifier and a security level are sequentially stored (steps 123 to 126).

Then, determination is made as to whether or not data regarding a collaboration work (collaboration) start has been received from other collaboration workers (step 127). If the data has been received, the processing returns to step 122 to execute the processing thereof. If the data has not been received, the processing of the collaboration work is started (step 128).

Figure 10:
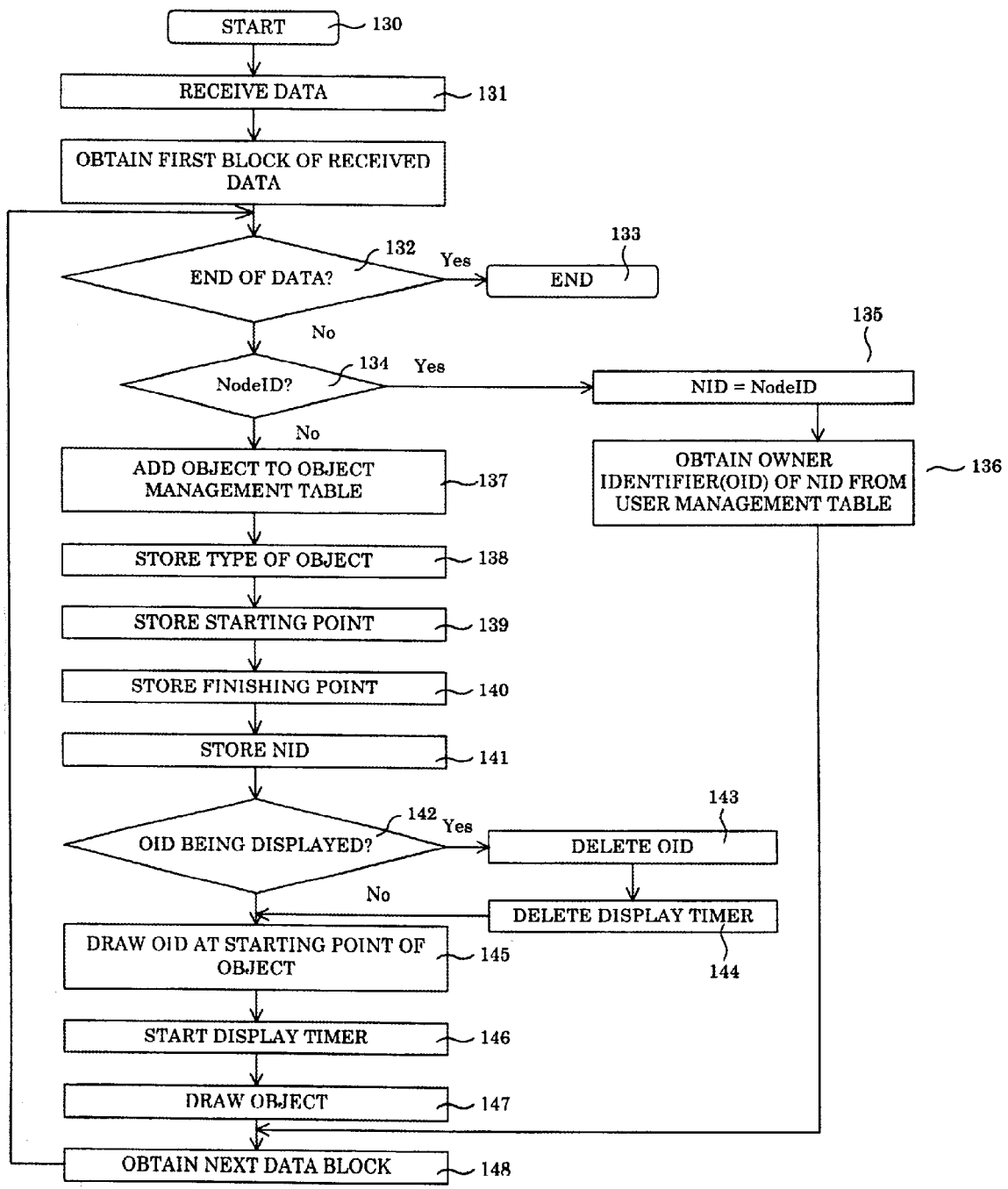
FIG. 10 is a flow chart showing an example of an operation during collaboration work.

FIG. 10 is a flow chart showing an example of an operation during collaboration work. When collaboration work data is transmitted from a certain collaboration client 102, the other collaboration clients 102 receive the data (step 130). This data has a format like that shown in FIG. 8.

The collaboration client 102 that has received the data obtains a first block of the received data (step 131), and makes determination as to the end of the data (step 132). If the data is determined as an end, a finishing operation is executed (step 133). If the end of the data is not determined, the processing moves to next step (step 134). The first block contains a UAID and a node ID. Then, determination is made as to whether the obtained data block is a node ID or not (step 134). If the node ID is determined, the obtained node ID is substituted for the NID (step 135), and an owner identifier (OID) corresponding to the NID (node ID) is obtained from the user management table 111. Then, moving to step 148, a next block is obtained (step 148), and the processing returns to step 132.

On the other hand, if the obtained data block is not a node ID (but it is object data), a new object is added to the object management table 113 (step 137). In the section of this new object, the type of the object, starting and finishing points thereof and an NID (node identifier) are respectively stored (steps 138 to 141).

Subsequently, determination is made as to whether or not an owner identifier (OID) corresponding to the node ID is being displayed (step 142). If it is being displayed, this owner identifier (OID) is deleted (step 143), and a display timer is deleted (step 144). Then, the processing proceeds to step 145. If the owner identifier (OID) is not being displayed, the processing proceeds to step 145 without passing through steps 143 and 144, and the owner identifier (OID) is drawn at the starting point of the object (step 145). The display timer is started at the time when the owner identifier (OID) is displayed (step 146), and the object is drawn (step 147). Then, a next data block is obtained (step 148), and returning to step 132 to continue the processing. When the end of the data block is detected in step 132, the processing is finished (step 133).

Figure 11:
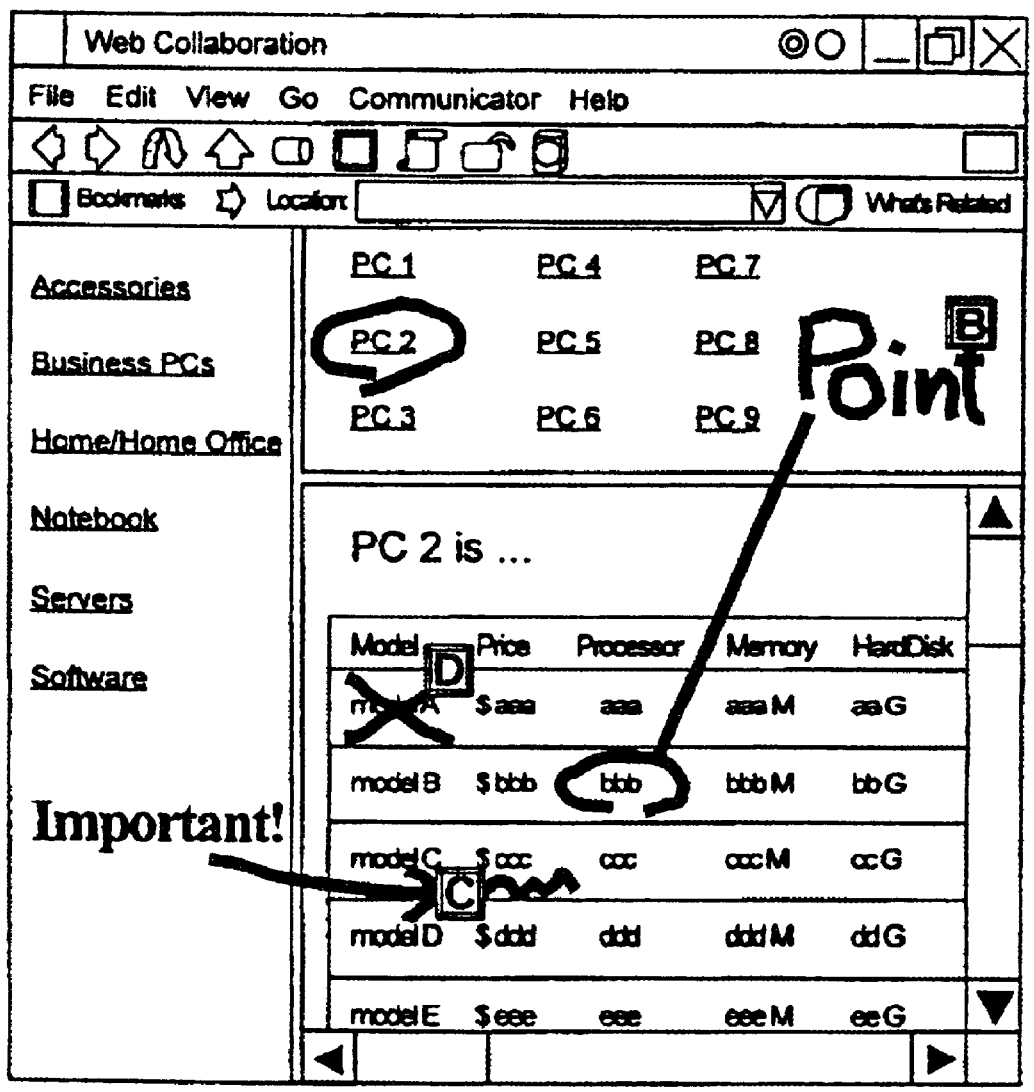
FIG. 11 is a screen view showing an example of a display screen.

FIG. 11 is a screen view showing an example of a display screen when the foregoing processing is executed. FIG. 11 specifically shows a case where users "B", "C" and "D" participating in collaboration work draw annotation images as objects almost simultaneously. The owner identifiers of the users "B", "C" and "D" are displayed by being superposed on the respective objects, and thus it is possible to identify the owner of each object. According to the described embodiment, through the foregoing steps, the owner identifier is displayed to the user watching the display screen almost simultaneously with the entry (drawing) of the object from the other user. In other words, the owner can be identified in real time. Accordingly, it is possible to identify the owner of the object of the collaboration work very easily.

Figure 12:
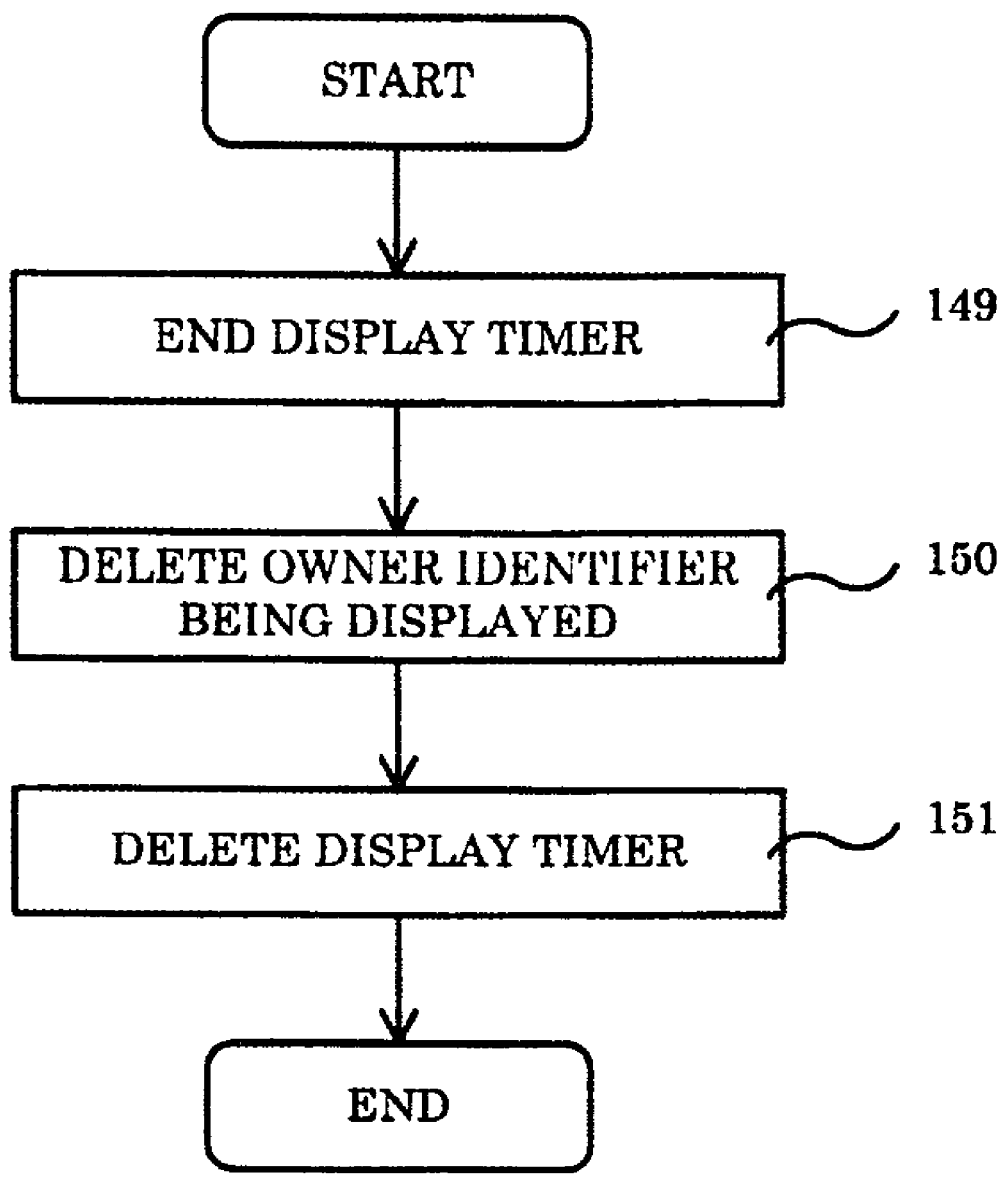
FIG. 12 is a flow chart showing an example of an ending processing of a display timer.

FIG. 12 is a flow chart showing an example of the ending processing of the display timer. After a display timer is generated and displaying is started, the display timer is ended at the time when time set by the timer is passed (step 149). Then, an owner identifier being displayed is deleted (step 150), and the display timer is deleted (step 151). Thus, only the owner identifiers (displaying of "B", "C" and "D" in FIG. 11) are deleted while the displaying of the objects is maintained. According to the embodiment, each owner identifier is displayed for a fixed period only while the object is being drawn, and then deleted. The owner identifier is displayed only during the drawing of the object that the user may wish to recognize, and its displaying may be an obstacle thereafter. By eliminating such unnecessary displaying, the display screen can be effectively utilized. As described later, the user can display the owner of the object when necessary.

According to the embodiment, owner identification is carried out by displaying the owner identifiers ("B", "C" and "D" in FIG. 11). However, objects may be displayed in the manner of discrimination from one another based on colors and tones given to the respective owners. Identification may also be carried out by flickering the objects based on patterns different among owners. In add-on, needless to say, any other forms of owner identification can be used.

Furthermore, according to the embodiment, the owner identifier is displayed at the starting point of the object. However, the owner identifier may be displayed at the finishing point of the object and any other points thereon. The owner identifier may also be displayed near the object as long as its relation to the object can be easily understood.

Figure 13:
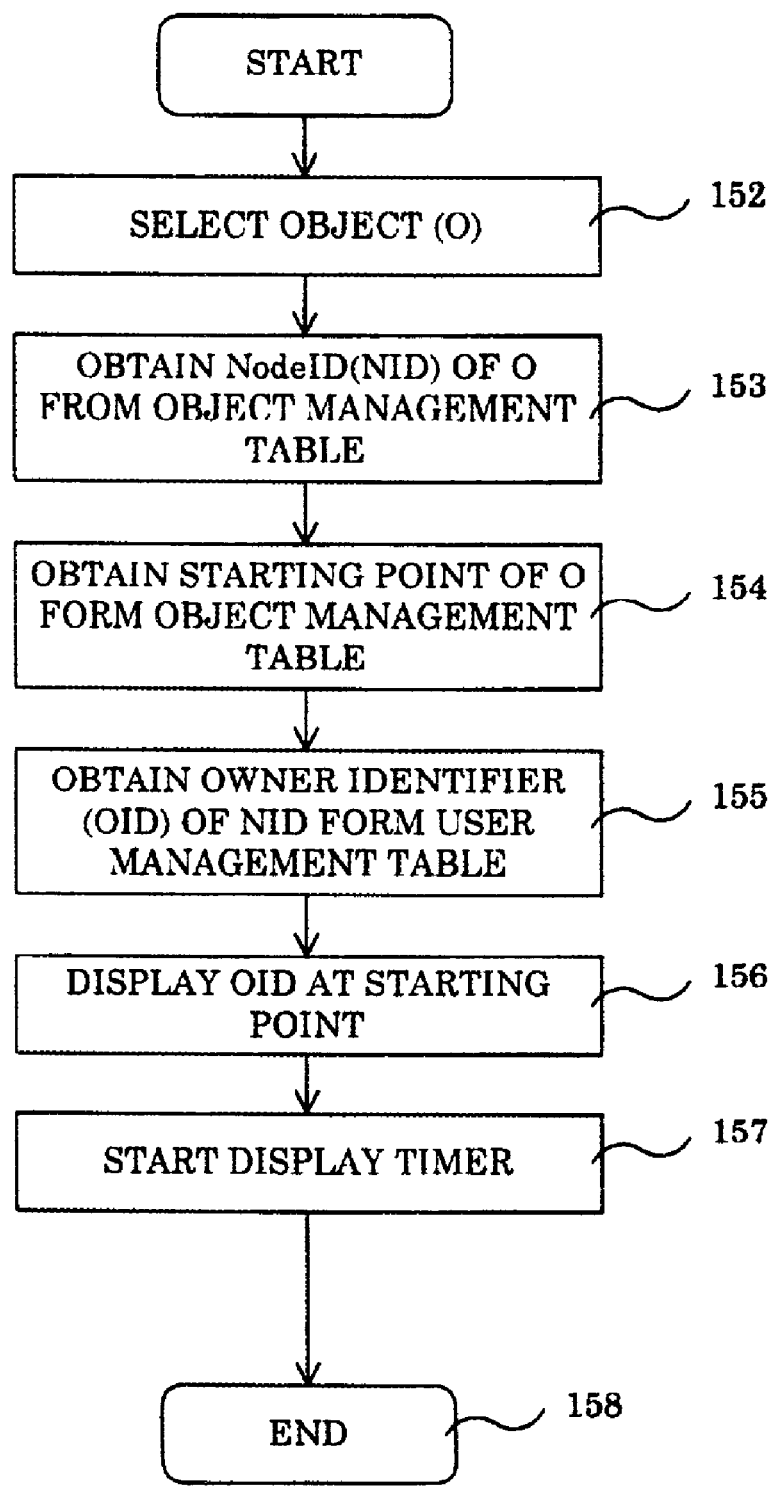
FIG. 13 is a flow chart showing an example of a method of identifying a collaboration work object according to another embodiment of the invention.

FIG. 13 is a flow chart showing an example of the method of identifying a collaboration work object according to another embodiment of the invention. The identifying method of this embodiment is implemented by using the same system as that of the first embodiment. Also, a processing executed at the time of starting collaboration work is identical to that of the first embodiment.

Now, a processing executed when a certain user taking part in the collaboration work wishes to identify the owner of an object is described. First, the user selects an object displayed in the work area 103 (step 152). This selection is made by positioning the icon (for example, an arrow) of the pointing device on the object to be selected, and then clicking with a mouse button in this state. The selection may also be made by keeping the icon on the object for a fixed period (several seconds).

Then, a node ID corresponding to the selected object is obtained from the object management table 113 (step 153). Thereafter, the starting point of the object is obtained from the object management table 113 (step 154), and an owner identifier corresponding to the node ID is obtained from the user management table 111 (step 155). The obtained owner identifier is then displayed at the obtained starting point of the object (step 156). Subsequently, the timer is started (step 157), and the processing is finished (step 158). The removal processing of the started timer is similar to that of the first embodiment.

Figure 14:
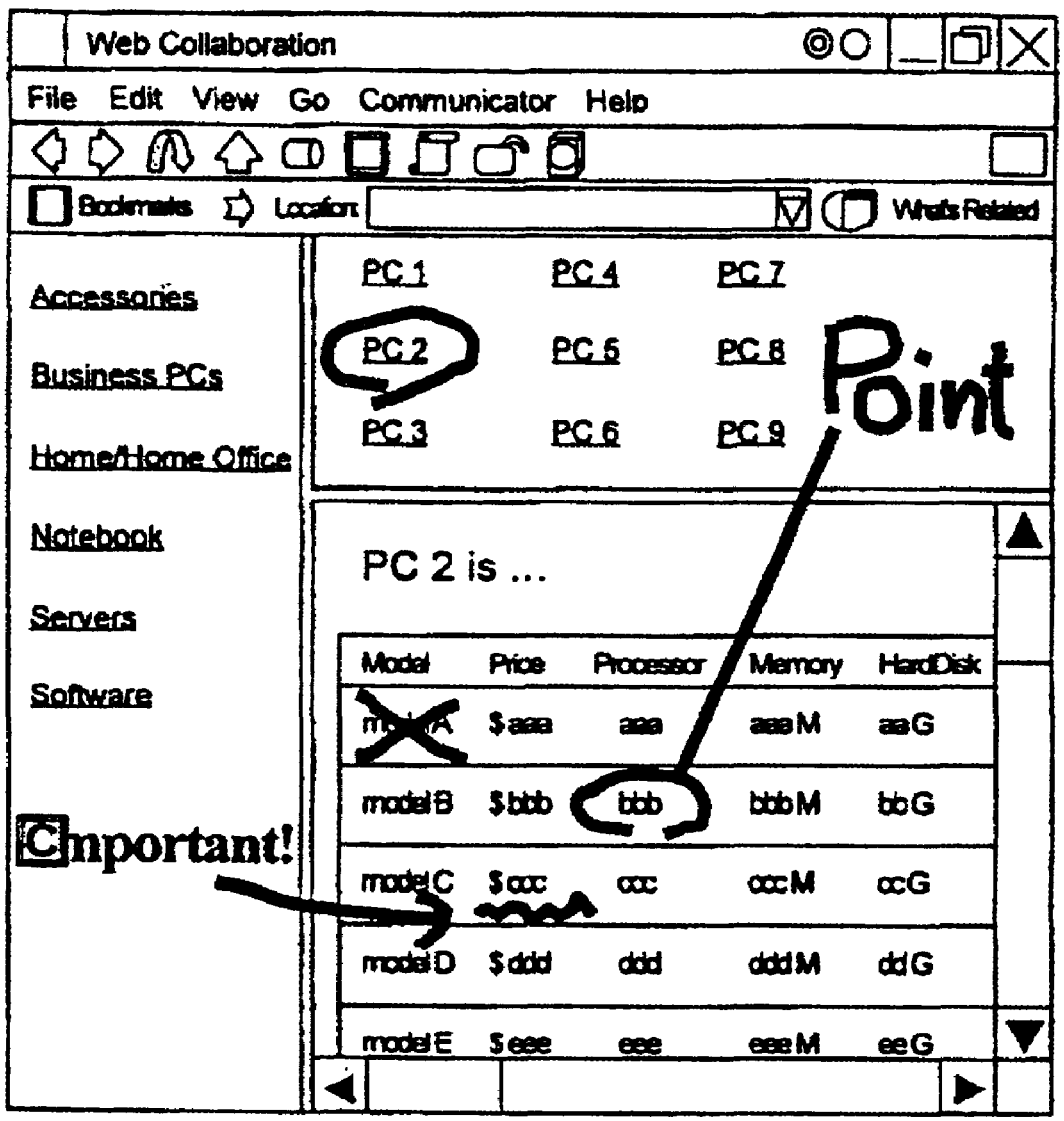
FIG. 14 is a screen view showing an example of a display screen.

FIG. 14 is a screen view showing an example of the display screen during the foregoing processing. FIG. 14 specifically shows a case where an object "Important!" is selected. An owner identifier "C" is displayed at the starting point of the object "Important!", and thus it can be identified that the owner of the object "Important!" is C. The identifying method of the embodiment enables the owner identifier to be displayed on the object whenever the user wishes, and the owner of the object to be easily identified.

The example of displaying the owner identifier at the starting point of the object was described. However, the owner identifier may be displayed in the manner of superposition at the finishing point of the object and any other points constituting the object. In addition, as long as its relation to the object is apparent, the owner identifier needs not be displayed on the object by means of superposition, but it may be displayed near the object.

Figure 15:
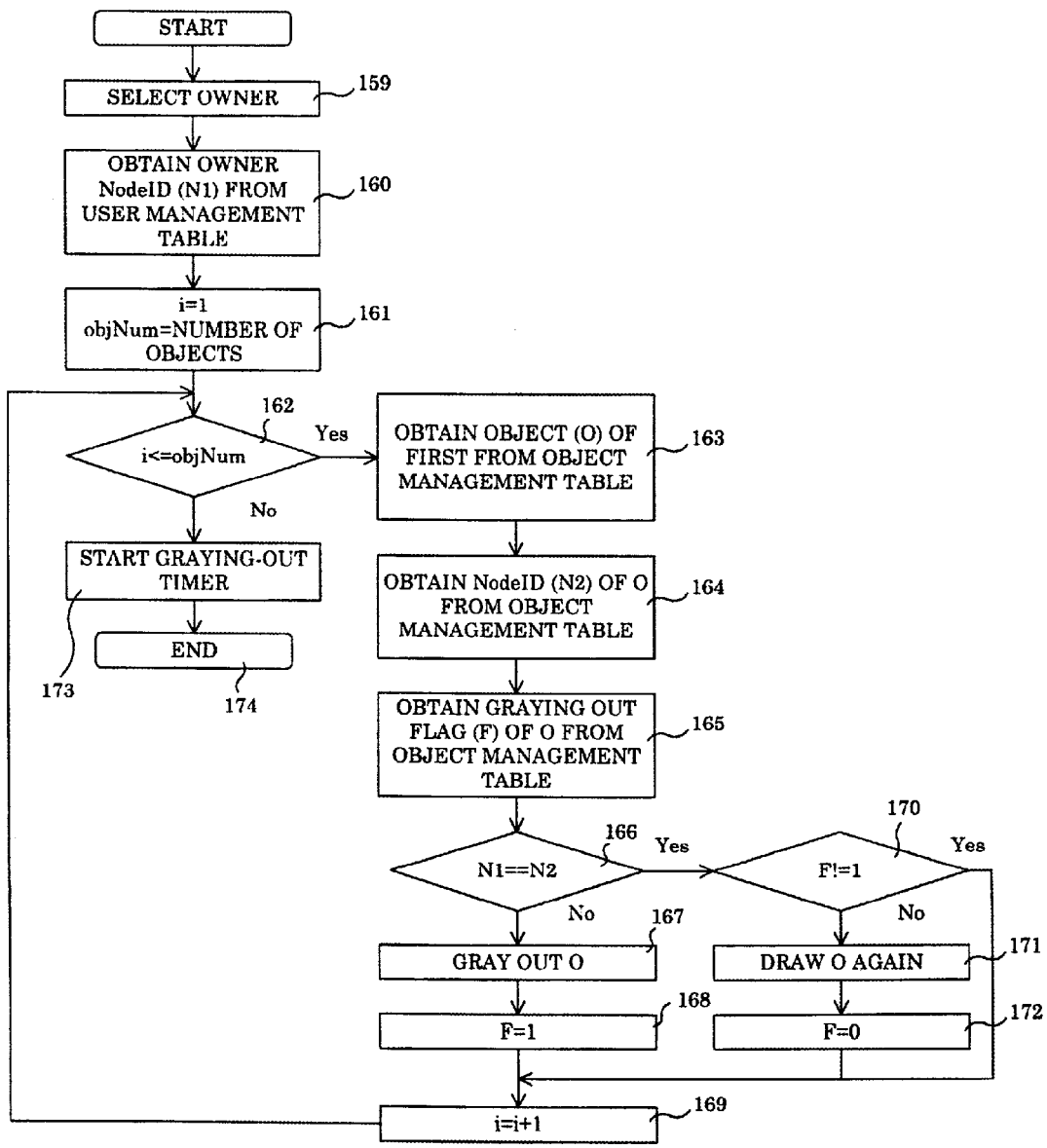
FIG. 15 is a flow chart showing an example of a method of identifying a collaboration work object according to yet another embodiment of the invention.

FIG. 15 is a flow chart showing an example of the method of identifying collaboration work objects according to yet another embodiment of the invention. The identifying method of the embodiment is implemented by using the same system as that of the first embodiment. A processing at the time of starting collaboration work is also identical to that of the first embodiment.

Now, a processing executed when a certain user taking part in the collaboration work wishes to identify the objects of a particular owner is described. First, the user selects an owner to be focused (step 159). Then, the node ID of the selected owner is obtained from the user management table 111 (step 160). The obtained node ID is stored as an N1.

Then, a numeral 1 is substituted for a variable i, and the number of objects is substituted for a variable objNum (step 161). Subsequently, in order to form a loop for all the objects, the variable i is determined (step 162). If the variable i is equal to the variable objNum or lower, an i-th object (0) is obtained from the object management table 113 (step 163), and a node ID (N2) of the object (0) is obtained from the object management table 113 (step 164). Further, a graying-out flag (F) of the object (0) is obtained from the object management table 113 (step 165).

Then, determination is made as to whether or not the node ID (N1) of the focused owner is equal to the obtained node ID (N2) (step 166). If inequality is determined (the owner (N2) of the targeted object is different from the owner (N1) of the originally focused object), the targeted object (0) is displayed by graying-out (step 167), and the flag set at 1 (indicating graying-out displaying) (step 168). Then, 1 is added to the variable i (step 169), and the processing returns to step 162.

If equality is determined (the owner (N2) of the currently targeted object is identical to the owner (N1) of the originally focused object), then determination is made as to whether the flag (F) is set as 1 (displayed by gray) or not (step 170). If graying-out displaying is determined (F=1), the object is drawn again (step 171), and then the flag is set as 0 (step 172) and the processing proceeds to step 169. If graying-out displaying is not determined (F!=1), the processing directly proceeds to step 169.

In step 169, 1 is added to the variable i, a similar operation is repeated while targeting an i+1st object. When the variable i exceeds objNum (the number of objects), the graying-out timer is started (step 173), and the processing is finished (step 174).

Figure 16:
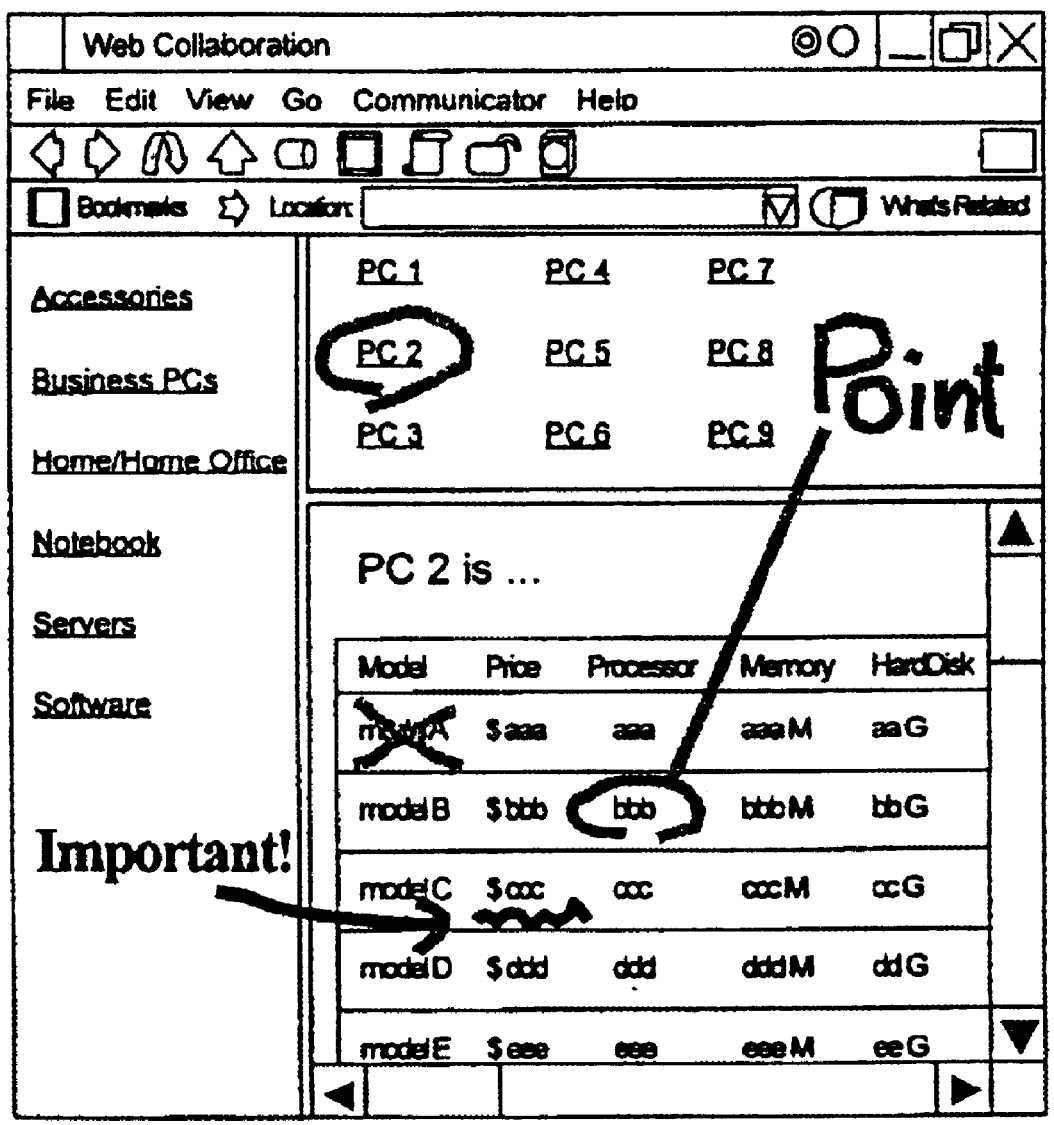
FIG. 16 is a screen view showing an example of a display screen.

FIG. 16 is a screen view showing an example of the display screen at the above stage. FIG. 16 specifically shows a case where the owner "C" is selected to focus. The objects of the owners other than the owner "C" are displayed by graying-out.

According to this embodiment, by paying attention to a particular owner, it is possible to easily discriminate the objects of this owner from the objects of the other owners. For example, when a review is made after the collaboration work, the use of the identifying method of the embodiment enables, by paying attention to a particular owner, only works carried out by this owner can be displayed in a clearly understood manner. Thus, reviewing can be efficiently carried out.

Figure 17:
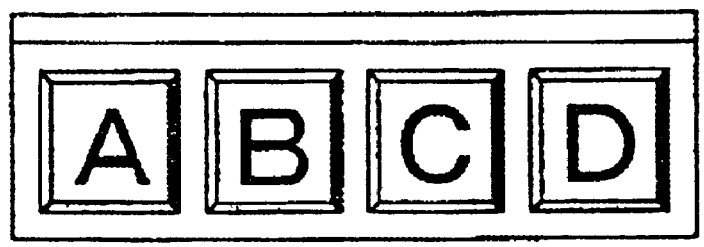
FIGS. 17(a) to 17(c) are partial display screen views, each thereof showing an example of an owner selecting method.
Figure 17:
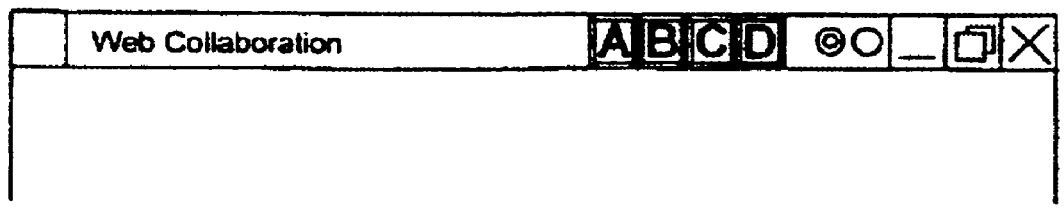

FIG. 17 is a partial display screen view showing an example of an owner selecting method. As shown in FIG. 17(a), a method can be employed, which displays a button indicating each owner by an icon in a dialogue box, and then selects the owner in the dialogue box. Alternatively, as shown in FIG. 17(b), a method can be employed, which displays a button indicating each owner by an icon in the menu section of the work area, and then selects the owner. Otherwise, as shown in FIG. 17(c), the owner selecting method described above with reference to the second embodiment can be employed.

Figure 18:
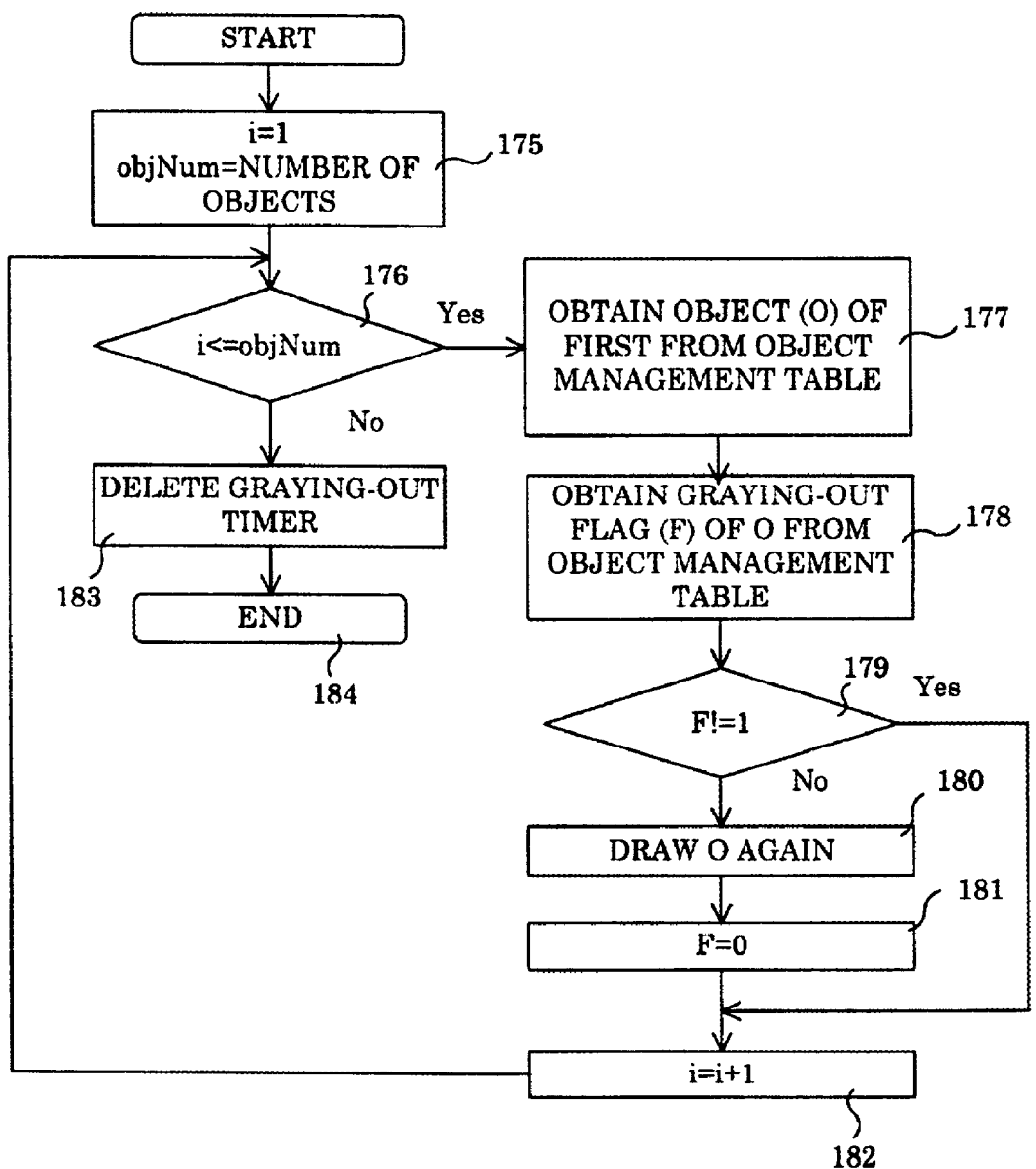
FIG. 18 is a flow chart showing an example of an ending processing of a graying-out timer.

FIG. 18 is a flow chart showing an example of the ending processing of the graying-out timer. A graying-out timer is generated, and after graying-out is started, the graying-out timer is ended with the passage of time set by the timer. Then, 1 is substituted for the variable i, and the number of objects is substituted for the variable objNum (step 175). In order to form a loop for all the objects, determination is made as to the variable i (step 176). If the variable i is equal to objNum or lower, an i-th object (0) is obtained from the object management table 113 (step 177), and a graying-out flag (F) of the object (0) is obtained from the object management table 113 (step 178). Then, determination is made as to whether the graying-out flag (F) is set as 1 (displayed by gray) or not (step 179). If graying-out displaying is determined (F=1), the object is drawn again (step 180), the flag is set as 0 (step 181), and then the processing proceeds to step 182. If graying-out displaying is not determined (F!=1), the processing directly proceeds to step 182. In step 182, 1 is added to the variable i, and a similar operation is repeated for the i+1st object as a target. When the variable i exceeds objNum (the number of objects), the graying-out timer is deleted (step 183), and the processing is finished (step 184).

Figure 19:
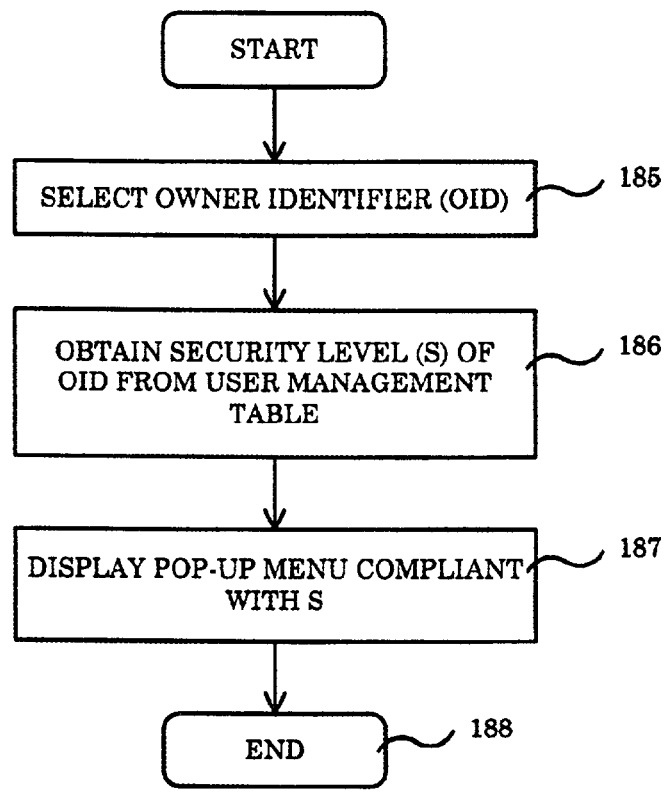
FIG. 19 is a flow chart showing another example of the identifying method of the embodiment.

According to this embodiment, the objects of respective owners can be edited and processed en bloc. FIG. 19 is a flow chart showing another example of the identifying method of the embodiment.

Figure 20:
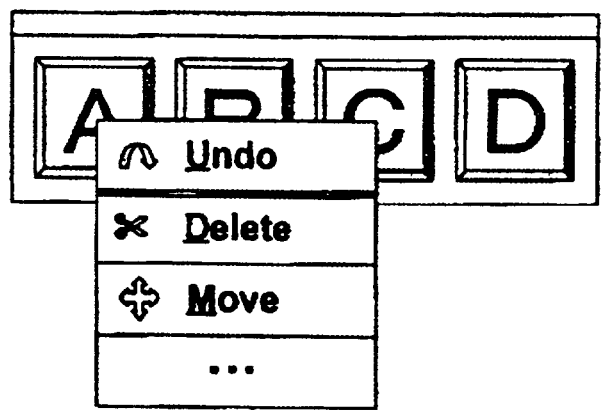
FIG. 20 is a display screen view showing an example of a display screen at a stage where a pop-up menu is displayed.

First, an owner to be focused is selected based on the selection of an owner identifier (OID) (step 185). Then, a security level corresponding to the owner identifier is obtained from the user management table 111 (step 186). Then, the pop-up menu of editing is displayed in accordance with the obtained security level (step 187). Subsequently, an editing operation is carried out, and the processing is finished (step 189). FIG. 20 is a display screen view showing an example of the display screen at a stage where the processing is executed, and the pop-up menu is displayed.

Such processing enables editing work to be carried out en bloc for the objects of the respective owners. In the example of FIG. 20, object deletion (Delete) is enabled. Needless to say, however, if deletion is not permitted because of the security level, "Delete" is not displayed on the menu.

The batch editing operation for the objects of the respective owners was described. Needless to say, however, an editing operation can be executed for each object.

The examples of displaying the objects of the unselected owners by graying-out were described. Needless to say, however, the unselected objects can be displayed in the manner of discrimination from the other objects by using different colors, flickering or the like. Also, for each of all the selected objects, an owner identifier like that described above with reference to the second embodiment can be displayed.

The present invention has been described in detail based on the preferred embodiments. However, the invention should not be limited to the embodiments, and various changes and modifications can be made without departing from the teachings of the invention.

Figure 21:
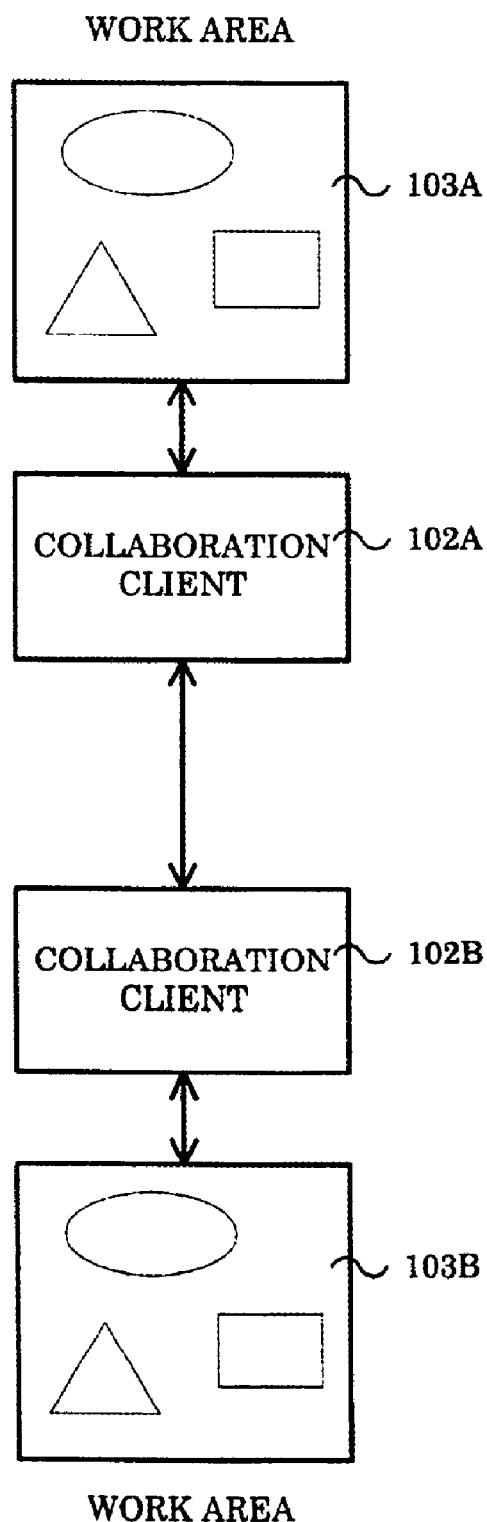
FIG. 21 is a conceptual view showing another example of the collaboration work system of the invention.
Figure 22:
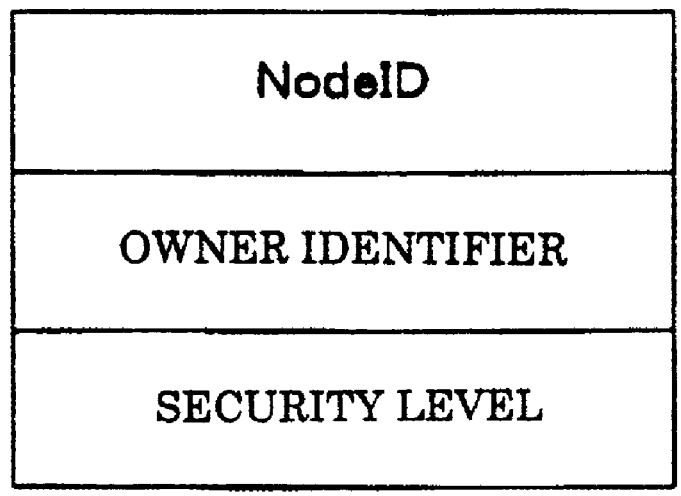
FIG. 22 is a view showing a format of data transmitted/received when collaboration work is started.
Figure 23:
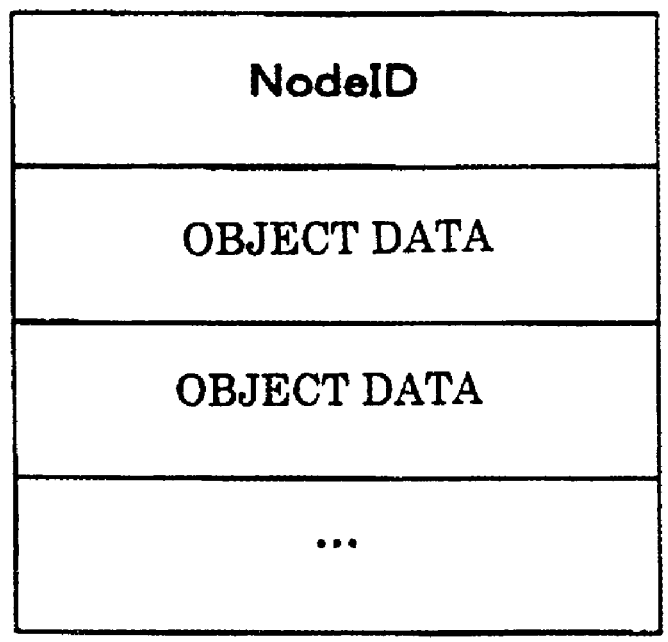
FIG. 23 is a view showing a format of data transmitted/received during collaboration work.

For example, in the embodiments, the collaboration clients 102 are interconnected through the session manager 101. However, as shown in FIG. 21, the collaboration clients 102A and 102B may be directly connected to each other without interpolating the session manager. In this case, the format for data at the time of starting collaboration work is like that shown in FIG. 22. The format of data during the collaboration work is like that shown in FIG. 23. In the data formats shown in FIGS. 22 and 23, no UAID used by the session manager is necessary, and other data are like those shown in FIGS. 7 and 8.

If not otherwise stated herein, it is to be assumed that all patents, patent applications, patent publications and other publications (including web-based publications) mentioned and cited herein are hereby fully incorporated by reference herein as if set forth in their entirety herein.

Although the preferred embodiments of the present invention have been described in detail, it should be understood that various changes, substitutions and alternations can be made therein without departing from spirit and scope of the inventions as defined by the appended claims.

The invention claimed is:

1. A method of identifying a collaboration work object, the object having been created based on collaboration work by using a computer system having a plurality of user systems connected to each other, alternatively a plurality of user systems connected to each other through a computer network, comprising the steps of:
    causing one of the user systems to store object data contained in collaboration work data received from the other user systems in an object management table by relating the data to a node identification code of each of the other user systems, wherein said object management table comprises node identification codes, object data, and graying-out flags;
    displaying on the screen of said user system the collaboration work objects created during a collaboration work session;
    displaying on the screen of said user system the owners of collaboration work objects created during said collaboration work session, wherein an owner is the creator of objects and wherein a particular owner can be selected; and
    displaying upon the selection of said particular owner by a system user all of said particular owner's collaboration work objects created by said particular owner during the collaboration work session in a manner such that the selected owner's collaboration work objects are discriminated from said other collaboration work objects, wherein a node identification code given for a user system of the selected owner by referring to a user management table of the user system and the work objects related to the obtained node identification code by referring to the object management table are obtained, wherein said user management table comprises node identification codes, user names, owner identifiers, and security levels.

2. The method of identifying a collaboration work object according to claim 1, wherein the displaying of each of the obtained objects on the screen is carried out by superposing an owner identifier, which indicates the creator of objects, related to the selected owner at one of starting and finishing points of the object, and other points of the object.

3. The method of identifying a collaboration work object according to claim 1, further comprising the step of performing an editing work including copying, movement, deletion and others for each of the obtained objects.

4. The method of identifying a collaboration work object according to claim 3, wherein the user management table further registers said security level information related to the node identification code, and the editing operation is permitted within a range compliant with the security level information.

5. The method of identifying the owner of a collaboration work object according to claim 1, further comprising the steps of:
    transmitting, when any one of the plurality of user systems starts collaboration work, user information containing a node identification code thereof and an owner identifier to the other user systems; and
    causing the other user systems having received the user information to store said information in each user management table.

6. The method of identifying the owner of a collaboration work object according to claim 1, wherein the displaying of the owner identifier on the screen in the manner of discrimination from the other objects is deleted or eliminated by a timer operation.

7. A computer readable storage medium recording program codes used to control a computer system having a plurality of user systems connected to each other, alternatively a plurality of user systems connected to each other through a computer network,
    wherein the program codes include:
    a program code for causing one of the user systems to store object data contained in collaboration work data received from the other user systems in an object management table by relating the data to a node identification code of each of the other user systems, and to display an object thereof on a screen of the user system, wherein said object management table comprises node identification codes, object data, and graying-out flags;

a program code for displaying on the screen of said user the owners of collaboration work objects created during said collaboration work session, wherein an owner is the creator of objects and wherein a particular owner can be selected;

a program code for displaying upon the selection of said particular owner by a system user all of said particular owner's collaboration work objects created by said particular owner during the collaboration work session in a manner such that the selected owner's collaboration work objects are discriminated from said other collaboration work objects, wherein a program code obtains a node identification code given for a user system of the selected owner by referring to a user management table of the user system and the work objects related to the obtained node identification code by referring to the object management table, wherein said user management table comprises node identification codes, user names, owner identifiers, and security levels.

8. The computer readable storage medium according to claim 7, wherein the computer system processes an event entry comprised of a drawing operation carried out by the owner of the object, or alternatively a selection operation carried out by a user other than the owner of the object.

9. The computer readable storage medium according to claim 7, wherein the owner identifier is displayed at one of starting and finishing points of a selected object, and at other points of the object by means of superposition.

10. The computer readable storage medium according to claim 9, further comprising program code for operating an editor for performing an editing operation including copying, movement, deletion and others for the obtained object.

11. The computer readable storage medium according to claim 10, wherein the user management table further registers security level information related to the node identification code, and the editing operation is permitted within a range compliant with the security level information.

12. The computer readable storage medium according to claim 7, further comprising program code for operating a deletor for deleting or eliminating by a timer operation the displaying on the screen of the user system the owner identifier discriminated from the other objects.

13. The computer readable storage medium according to claim 7, further comprising program code for operating a session controller for controlling a session for each collaboration work, wherein the session controller includes a session management table for registering a session identification code for identifying the session, a user identification code for identifying a user taking part in the session, and a node identification code of the user system used by the user, and the session controller refers to the session management table to transmit the data to the other user systems taking part in the session by registering the user identification code contained in data sent from the user.

* * * * *